US007496517B2

(12) United States Patent
Sperschneider et al.

(10) Patent No.: US 7,496,517 B2

(45) **Date of Patent: *Feb. 24, 2009**

(54) METHOD AND DEVICE FOR GENERATING A SCALABLE DATA STREAM AND METHOD AND DEVICE FOR DECODING A SCALABLE DATA STREAM WITH PROVISION FOR A BIT SAVING BANK FUNCTION

(75) Inventors: Ralph Sperschneider, Erlangen (DE); Bodo Teichmann, Fuerth (DE); Manfred Lutzky, Nuremberg (DE); Bernhard Grill, Lauf (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 843 days.

This patent is subject to a terminal disclaimer.

(21) Appl. No.: 10/466,866

(22) PCT Filed: Jan. 14, 2002

(86) PCT No.: PCT/EP02/00295

§ 371 (c)(1),
(2), (4) Date: Dec. 19, 2003

(87) PCT Pub. No.: WO02/058051

PCT Pub. Date: Jul. 25, 2002

(65) Prior Publication Data

US 2004/0107289 A1 Jun. 3, 2004

(30) Foreign Application Priority Data

Jan. 18, 2001 (DE) ................................ 101 02 154

(51) Int. Cl.

*G10L 21/04* (2006.01)
*G10L 11/00* (2006.01)
*G10L 19/14* (2006.01)
*G10L 19/02* (2006.01)
*H04N 11/02* (2006.01)

(52) U.S. Cl. ....................... 704/501; 704/500; 704/502; 704/503; 704/504; 704/200; 704/211; 704/205; 704/229; 348/384.1

(58) Field of Classification Search ................. 704/229, 704/500, 200.1, 501, 502, 503, 200.01, 511, 704/505; 348/384.1

See application file for complete search history.

(56) References Cited

U.S. PATENT DOCUMENTS 5,365,552 A * 11/1994 Astle .......................... 375/354

(Continued)

FOREIGN PATENT DOCUMENTS

DE 3912605 A1 10/1990

(Continued)

OTHER PUBLICATIONS

Kikuchi, Y. et al. RTP Payload Format for MPEG-4 Audio/Visual Streams. The Internet Society. Nov. 2000. pp. 1-13.*

(Continued)

*Primary Examiner*—Patrick N Edouard
*Assistant Examiner*—Paras Shah
(74) *Attorney, Agent, or Firm*—Michael A. Glenn; Glenn Patent Group

(57) ABSTRACT

In a method for generating a scalable data stream from one or several blocks of output data of a first encoder and from one or several blocks of output data of a second encoder a determining data block for a current section of an input signal is written. In addition, output data of the second encoder representing a preceding section of the input signal are written in transmission direction from an encoder to a decoder after the determining data block. When the output data of the second encoder are written for a preceding section of the input signal, the output data of the second encoder are written representing the current section of the input signal. In order to signalize where the output data of the second encoder for the preceding section end and where the output data of the second encoder for the current section begin, buffer information is written into the scalable data stream. By the fact that output data of a preceding section follow a determining data block for the current section, a bit savings bank function may be implemented in the scalable encoder and simply be signalized in the bit stream.

11 Claims, 8 Drawing Sheets

U.S. PATENT DOCUMENTS

| | | | | |
|---|---|---|---|---|
| 5,758,092 | A * | 5/1998 | Agarwal | 709/247 |
| 6,092,041 | A | 7/2000 | Pan et al. | |
| 6,108,625 | A * | 8/2000 | Kim | 704/229 |
| 6,182,031 | B1 * | 1/2001 | Kidder et al. | 704/205 |
| 6,349,284 | B1 * | 2/2002 | Park et al. | 704/500 |
| 6,438,525 | B1 * | 8/2002 | Park | 704/500 |
| 6,446,037 | B1 * | 9/2002 | Fielder et al. | 704/229 |
| 6,904,089 | B1 * | 6/2005 | Sueyoshi et al. | 704/229 |
| 2003/0065518 | A1 * | 4/2003 | Heo | 704/500 |
| 2003/0088423 | A1 * | 5/2003 | Nishio et al. | 704/500 |

FOREIGN PATENT DOCUMENTS

| | | | |
|---|---|---|---|
| EP | 0918401 | A2 | 5/1999 |
| EP | 0884850 | A2 | 12/1999 |
| JP | 2000307661 | A * | 11/2000 |
| WO | WO97/14229 | | 4/1997 |
| WO | WO99/33274 | | 7/1999 |

OTHER PUBLICATIONS

Brandenburg et al., MPEG-4 natural audio coding, Elsevier Science B.V., Signal Processing Image Communication 15, (2000), pp. 423-444.

Balakrishnan, M., Buffer Constrainets in a Variable Packetized Video System, IEEE (1995) pp. 29-32.

Moriya, T. MPEG-4 Audio Standardization and TwinVQ. pp. 81-86, 1999.

Fukawa, et al. The Throughput Improvement of a Non-RTP Packet to Control RTP Packet Priority. pp. 109-114, 2000.

Komura, et al. Layered Transmission of Multimedia Data and Control of Packet Order. Feb. 2000. pp. 271-278.

* cited by examiner (Prior Art)

(Prior Art)

(Prior Art)

(Prior Art)

METHOD AND DEVICE FOR GENERATING A SCALABLE DATA STREAM AND METHOD AND DEVICE FOR DECODING A SCALABLE DATA STREAM WITH PROVISION FOR A BIT SAVING BANK FUNCTION

This Application claims priority under 35 U.S.C. 119 to German Application No. 10102154.2, filed Jan. 18, 2001 and PCT Application, PCT/EP02/00295, the disclosure of each which is expressly incorporated herein by reference in its entirety.

FIELD OF THE INVENTION

The present invention relates to scalable encoders and decoders and in particular to the generation of scalable data streams through which a bit savings bank may be signalized.

BACKGROUND OF THE INVENTION AND PRIOR ART

Scalable encoders are shown in EP 0 846 375 B1. In general, scalability is understood as the possibility of decoding a partial section of a bit stream representing an encoded data signal, e.g. an audio signal or a video signal into a useful signal. This property is particularly desirable when e.g. a data transmission channel fails to provide the complete bandwidth necessary for transmitting a complete bit stream. On the other hand, an incomplete decoding is possible on a decoder with reduced complexity. Generally, different discrete scalability layers are defined in practice.

An example of a scalable encoder as defined in Subpart 4 (General Audio) of Part 3 (Audio) of the MPEG-4 Standard (ISO/IEC 14496-3; 1999 Subpart 4) is shown in FIG. 1. An audio signal s(t) to be encoded is fed into the scalable encoder on the input side. The scalable encoder shown in FIG. 1 contains a first encoder 12, which is an MPEG Celp encoder. The second encoder 14 is an AAC encoder, which provides high-quality audio encoding and is defined in the Standard MPEG-2 AAC (ISO/IEC 13818). The Celp encoder 12 provides a first scaling layer via an output line 16, while the AAC encoder 14 provides a second scaling layer via a second output line 18, to a bit stream multiplexer (BitMux) 20. On the output side the bit stream multiplexer then outputs an MPEG-4-LATM bit stream 22 (LATM=Low-Overhead MPEG-4 Audio Transport Multiplex). The LATM format is described in Section 6.5 of Part 3 (Audio) of the first supplement to the MPEG-4 Standard (ISO/IEC 14496-3:1999/AMD1:2000).

The scalable audio encoder further includes some further elements. First, there exists a delay stage 24 in the AAC branch and a delay stage 26 in the Celp branch. With both delay stages it is possible to set an optional delay for the respective branch. A downsampling stage 28 is downstream of the delay stage 26 of the Celp branch to adjust the sampling rate of the input signal s(t) to the sampling rate requested by the Celp encoder. An inverse Celp decoder 30 is downstream to the Celp encoder 12, wherein the Celp encoded/decoded signal is then supplied to an upsampling stage 32. The upsampled signal is then supplied to a further delay stage 34, which is termed "Core Coder Delay" in the MPEG-4 Standard.

The stage CoreCoderDelay 34 has the following function. If the delay is set to zero, the first encoder 14 and the second encoder 12 process exactly the same samples of the audio input signal in a so-called superframe. A superframe might e.g. consist of three AAC frames, which together represent a certain number of samples No. x to No. y of the audio signal. The superframe further includes e.g. 8 CELP blocks, which represent the same number of samples and also the same samples No. x to No. y if CoreCoderDelay=0.

If, however, a CoreCoderDelay D is set as a time value other than zero, the three blocks of AAC frames nevertheless represent the same samples No. x to No. y. The eight blocks of CELP frames, in contrast, represent the samples No. x-Fs D to No. y-Fs D, wherein Fs is the sampling frequency of the input signal.

The current time sections of the input signal in a superframe for the AAC blocks and the CELP blocks can thus be either identical, when CoreCoderDelay D=0, or be shifted relative to each other by CoreCoderDelay, when D is not equal to zero. For the following implementations, however, it will be assumed, on the grounds of simplicity and without restriction of generality, that CoreCoderDelay=0, so that the current time section of the input signal for the first encoder and the current time section for the second encoder are identical. In general, however, the only requirement for a superframe is, that the AAC block(s) and the CELP block(s) in a superframe represent the same number of samples, wherein it is not necessary for the samples themselves to be identical to one another, but they may also be shifted relative to each other by CoreCoderDelay.

It should be noted that the Celp encoder, depending on the configuration, may process a section of the input signal s(t) faster than the AAC encoder 14. In the AAC branch a block decision stage 26 is downstream to the optional delay stage 24 which establishes among other things whether short or long windows should be used for windowing the input signal s(t), wherein short windows must be chosen for strongly transient signals, while long windows are preferred for less transient signals since the relationship between the amount of payload data and page information is better than for short windows.

By the block decision stage 26 a fixed delay by e.g. 5/8 times a block is performed in the present example. This is referred to as a look-ahead function in the art. The block decision stage must already look ahead a certain time to be able to determine whether there are transient signals in future that must be encoded with short windows. After that the corresponding signal in the Celp branch as well as the signal in the AAC branch are fed to means for converting the time-related illustration to a spectral illustration, which is designated as MDCT 36 or 38, respectively, in FIG. 1 (MDCT=modified discrete cosine transform). The output signals of the MDCT blocks 36, 38 are then supplied to a subtracter 40.

At this point, samples belonging together regarding time must be present, i.e. the delay must be identical in both branches.

The following block 44 determines whether it is more favorable to supply the input signal itself to the AAC encoder 14. This is enabled via the bypass branch 42. If it is determined, however, that the differential signal at the output of the subtracter 40 is smaller regarding energy than the signal output by the MDCT block 38, then not the original signal but the differential signal is taken to be encoded by the AAC encoder 14 to finally form the second scaling layer 18. This comparison may be performed band by band, which is indicated by frequency-selective switching means (FSS) 44. The exact functions of the individual elements are known in the art and are described for example in the MPEG-4 standard as well as in further MPEG standards.

One main feature in the MPEG-4 standard and in other encoder standards, respectively, is that the transmission of the compressed data signal is to be performed with a constant bit rate via a channel. All high-quality audio codecs operate based on blocks, i.e. they process blocks of audio data (order 480-1024 samples) to pieces of a compressed bit stream, which are also referred to as frames. The bit stream format must here be set up so that a decoder without a priory information where a frame starts is able to recognize the beginning of a frame in order to start the output of decoded audio signal data with a lowest possible delay. Thus, each header or determining data block of a frame starts with a certain synchronization word which may be searched for in a continuous bit stream. Further common components within the data stream apart from the determining data block are the main data or "payload data" of the individual layers in which the actual compressed audio data is contained.

FIG. 4 shows a bit stream format with a fixed frame length. In this bit stream format the headers or determining data blocks are inserted equidistantly into the bit stream. The side information associated with this header and the main data follow immediately afterwards. The length, i.e. the number of bits, for the main data is the same in each frame. Such a bit stream format as it is shown in FIG. 4 is for example used in the MPEG layer 2 or the MPEG-CELP.

FIG. 5 shows another bit stream format with a fixed frame length and a backpointer. In this bit stream format the header and the side information are arranged equidistantly as in the format illustrated in FIG. 4. The start of the associated main data is, however, only performed exceptionally directly following a header. In most cases the start is in one of the preceding frames. The number of bits by which the start of the main data is shifted in the bit stream is transferred by the page information variable backpointer. The end of these main data may lie within this frame or within a preceding frame. The length of the main data is therefore not constant any more. Therefore, the number of bits with which a block is encoded may be adjusted to the characteristics of the signal. Simultaneously, a constant bit rate may be achieved, however. This technology is called "bit savings bank" and increases the theoretical delay within the transmission chain. Such a bit stream format is for example used in the MPEG layer 3 (MP3). The technology of the bit savings bank is further described in the standard MPEG layer 3.

Generally, the bit savings bank represents a buffer of bits which may be used to provide more bits for encoding a block of time sample as is actually allowed by the constant output data rate. The technology of the bit savings bank takes into account that some blocks of audio samples may be encoded with less bits than predetermined by the constant transmission rate, so that through these blocks the bit savings bank is filled, while again other blocks of audio samples comprise psychoacoustic characteristics which do not allow such a high compression so that for these blocks the available bits would actually not be enough for a low-interference or interference-free encoding, respectively.

The additional bits needed are taken from the bit savings bank so that the bit savings bank is emptied with such blocks.

Such an audio signal may, however, be also transmitted by a format with a variable frame length, as it is shown in FIG. 6. With the bit stream format "variable frame length", as it is illustrated in FIG. 6, the fixed sequence of the bit stream elements header, page information and main data is maintained, as with the "fixed frame length". As the length of the main data is not constant, the bit savings bank technology may also be used here, there are, however, no backpointers needed as in FIG. 5. One example for a bit stream format, as it is illustrated in FIG. 6, is the transport format ADTS (audio data transport stream), as it is defined in the standard MPEG 2 AAC.

It is to be noted that the above-mentioned encoders are no scalable encoders but include only one single audio encoder.

In MPEG 4 the combination of different encoder/decoders to a scalable encoder/decoder is provided. It is therefore possible and sensible to combine one CELP voice encoder as the first encoder with an AAC encoder for the further scaling layer(s) and pack the same into one bit stream. The purpose of this combination is that the possibility remains open either to decode all scaling layers and therefore reach a best possible audio quality, or parts of the same, maybe even only the first scaling layer, with the correspondingly restricted audio quality. Reasons for only decoding the lowest scaling layer may be that due to a bandwidth of the transmission channel which is too small, the decoder only received the first scaling layer of the bit stream. Because of this the parts of the first scaling layer in the bit stream are favored over the second and the further scaling layers in the transmission, whereby the transmission of the first scaling layer is guaranteed with capacity bottlenecks in the transmission network, while the second scaling layer may be lost completely or in part.

A further reason may be that a decoder wants to achieve a lowest possible codec delay and therefore decodes only the first scaling layer. It is to be noted that the codec delay of a Celp code is generally significantly smaller than the delay of the AAC code.

In MPEG 4 version 2 the transport format LATM is standardized, which may among other things also transmit scalable data streams.

In the following, reference is made to FIG. 2*a*. FIG. 2*a* is a schematical illustration of the samples of the input signal s(t). The input signal may be divided into different successive sections 0, 1, 2, 3, wherein each section comprises a certain fixed number of time samples. Usually, the AAC encoder 14 (FIG. 1) processes a whole section 0, 1, 2 or 3 in order to provide an encoded data signal for this section. The CELP encoder 12 (FIG. 1), however, processes usually a smaller amount of time samples per encoding step. Thus, it is shown as an example in FIG. 2*b*, that the CELP encoder or generally speaking the first encoder or encoder 1 comprises a block length which is one fourth of the block length of the second encoder. It is to be noted that this division is completely random. The block length of the first encoder may also be half as long, might, however, also be one eleventh of the block length of the second encoder. Thus, the first encoder will generate four blocks (11, 12, 13, 14) from the section of the input signal, from which the second encoder provides one block of data. In FIG. 2*c* a common LATM bit stream format is shown.

One superframe may comprise several ratios of number of AAC frames to number of CELP frames, as it is illustrated in tabular form in MPEG 4. Thus, a superframe may for example comprise one AAC block and 1 to 12 CELP blocks, 3 AAC blocks and 8 CELP blocks but also e.g. for example more AAC blocks than CELP blocks, depending on the configuration. An LATM frame which comprises an LATM determining data block includes a superframe or also several superframes.

The generation of the LATM frame opened by the header 1 is described as an example. First, the output data blocks 11, 12, 13, 14 of the Celp encoder 12 (FIG. 1) are generated and buffered. In parallel, the output data block of the AAC encoder designated with "1" in FIG. 2*c* is generated. Then, when the output data block of the AAC encoder has been generated, first of all the determining data block (header 1) is written. Depending on the convention, the output data block of the first encoder which was generated first, designated with 11 in FIG. 2*c*, may be written, i.e. transmitted, directly following header 1. Usually (regarding the few necessary signalizing information) an equidistant distance of the output data blocks of the first encoder is selected for a further writing and/or transmitting of the data stream, as it is illustrated in FIG. 2*c*. This means, that after writing and/or transmitting block 11 the second output data block 12 of the first encoder, then the third output data block 13 of the first encoder and then the fourth output data block 14 of the first encoder are written and/or transmitted in equidistant distances. The output data block 1 of the second encoder is filled into the remaining gaps during the transmission. Then, an LATM frame is fully written, i.e. fully transmitted.

A disadvantage of the known bit stream formats illustrated in FIGS. 4 to 6 is the fact that the same are not suitable for scalable data streams.

A further disadvantage of the known bit stream formats is, that no bit stream format exists for a scalable data stream, so that the bit savings bank function for scalable data streams with output data of encoders having a different time basis may currently, in particular, not be made useable for the combination of AAC encoders and celp encoders of a scalable encoding device. As, however, a constant transmission rate is required, the AAC encoder, however, outputs blocks of a different length depending on the characteristics of the encoded signal, the case may well occur, that the AAC encoder requires more bits for the encoding of a section of the time signal than predetermined by the transmission rate, while it requires less bits for a different section than predetermined by the output data rate. Thus, the AAC encoder of the scalable encoding device will run out of bits in the latter case, while the AAC encoder of the scalable encoding device will not be able to avoid to introduce audible interferences into the encoded and again decoded signal in the first case in order to maintain the constant output data rate.

SUMMARY OF THE INVENTION

It is the object of the present invention to provide a method and a device for generating a scalable data stream suitable for the use of a bit savings bank function for a scaling layer, and to provide a method and a device for decoding a scalable data stream.

In accordance with a first aspect of the invention, this object is achieved by a method for generating a scalable data stream from one or several blocks of output data of a first encoder and from one or several blocks of output data of a second encoder, wherein the one or the several blocks of output data of the first encoder together represent a number of samples of the input signal for the first encoder forming the current section of the input signal for the first encoder, and wherein the one block or the several blocks of output data of the second encoder together represent a number of samples of the input signal for the second encoder, wherein the number of samples for the second encoder represent a current section of the input signal for the second encoder, wherein the number of samples for the first encoder and the number of samples for the second encoder are equal and wherein the current sections for the first and the second encoders are identical or shifted to each other by a period of time, comprising: writing a determining data block for the current section of the input signal for the first or the second encoder; writing output data of the second encoder representing a preceding section of the input signal for the second encoder, in transmission direction from an encoder to a decoder after the determining data block; writing output data of the second encoder representing the current section of the input signal for the second encoder, when the output data of the second encoder for the preceding section of the input signal are written; writing buffer information into the scalable data stream, wherein the buffer information indicates how far the output data of the second encoder for the preceding section extend beyond the determining data block for the second encoder; and writing the one or the several blocks of output data of the first encoder into the scalable data stream.

In accordance with a second aspect of the invention, this object is achieved by a device for generating a scalable data stream from one or several blocks of output data of a first encoder and from one or several blocks of output data of a second encoder, wherein the one or the several blocks of output data of the first encoder together represent a number of samples of the input signal for the first encoder, forming a current section of the input signal for the first encoder, and wherein the one block or the several blocks of output data of the second encoder together represent a number of samples of the input signal for the second encoder, wherein the number of samples for the second encoder form a current section of the input signal for the second encoder, wherein the number of samples for the first encoder and the number of samples for the second encoder are equal and wherein the current sections for the first and the second encoders are identical or shifted from each other by a period of time, comprising: means for writing a determining data block for the current section of the input signal for the first or the second encoder; means for writing output data of the second encoder representing a preceding section of the input signal for the second encoder, in transmission direction from an encoder to an decoder after the determining data block; means for writing output data of the second encoder representing the current section of the input signal for the second encoder when the output data of the second encoder for the preceding section of the input signal are written; means for writing buffer information into the scalable data stream, wherein the buffer information indicates how far the output data of the second encoder for the preceding section extend beyond the determining data block for the second encoder; and means for writing the one or the several blocks of output data of the first encoder into the scalable data stream.

In accordance with a third aspect of the invention, this object is achieved by a method for decoding a scalable data stream from one or several blocks of output data of a first encoder and from or several blocks of output data of a second encoder, wherein the one or the several blocks of output data of the first encoder together represent a number of samples of the input signal for the first encoder, forming a current section of the input signal for the first encoder, and wherein the one block or the several blocks of output data of the second encoder together represent a number of samples of the input signal for the second encoder, wherein the number of samples for the second encoder form a current section of the input signal for the second encoder, wherein the number of samples for the first encoder and the number of samples for the second encoder are equal, and wherein the current sections for the first and the second encoder are identical or shifted to each other by a period of time, wherein the scalable data stream comprises a determining data block for the current section for the first or the second encoder, output data of the second encoder for a preceding section of the input signal in transmission direction after the determining data block, and buffer information, indicating how far the output data of the second encoder for the preceding section extend beyond the determining data block, comprising the following steps: reading the determining data block for the current section of the input signal for the first or the second encoder; reading the output data of the first encoder for the current section of the first encoder; reading the buffer information; reading the output data of the second encoder for the current section starting from a position in the scalable data stream indicated by the buffer information; and decoding the output data of the second encoder and the output data of the first encoder to obtain a decoded signal.

In accordance with a fourth aspect of the invention, this object is achieved by a device for decoding a scalable data stream from one or several blocks of output data of a first encoder and from or several blocks of output data of a second encoder, wherein the one or the several blocks of output data of the first encoder together represent a number of samples of the input signal for the first encoder, forming a current section of the input signal for the first encoder, and wherein the one block or the several blocks of output data of the second encoder together represent a number of samples of the input signal for the second encoder, wherein the number of samples for the second encoder form a current section of the input signal for the second encoder, wherein the number of samples for the first encoder and the number of samples for the second encoder are equal, and wherein the current sections for the first and the second encoder are identical or shifted to each other by a period of time, wherein the scalable data stream comprises a determining data block for the current section for the first or the second encoder, output data of the second encoder for a preceding section of the input signal in transmission direction after the determining data block, and buffer information, indicating how far the output data of the second encoder for the preceding section extend beyond the determining data block, comprising: a bit stream demultiplexer, adapted to be able to perform the following steps: reading the determining data block for the current section of the input signal for the first or the second encoder; reading the output data of the first encoder for the current section of the first encoder; reading the buffer information; reading the output data of the second encoder for the current section starting from a position in the scalable data stream indicated by the buffer information; and means for decoding the output data of the second encoder and the output data of the first encoder to obtain a decoded signal.

The present invention is based on the findings that the known concept illustrated in FIG. 2*c* needs to be discarded, which is that any data of an output data block of the second encoder are arranged between two successive LATM headers. Instead it is permitted that also output data of the second encoder which represent a preceding time section of the input signal is written after a determining data block for the current time section, wherein this fact or the number of data still to be written in transmission direction after the determining data block, respectively, is signalized to a decoder by special buffer information also to be transmitted.

The decoder may then easily determine based on a determining data block and using the buffer information, where the output data of the second encoder end and where the output data of the second encoder for the current time section begin, so that the decoder is able to bring the corresponding output data blocks of the first encoder in connection with the corresponding output data blocks of the second encoder to decode the signal again in all layers, wherein the term "corresponding" relates to the fact that the respective data of the first and the second encoder are related to the same section of the input signal in case of CoreCoderDelay equal zero (see FIG. 1) or to current sections for the first and the second encoder shifted by CoreCoderDelay.

In an inventive method for generating a scalable data stream from one or several blocks of output data of a first encoder and from one or several blocks of output data of a second decoder a determining data block is therefore written for a current section of the input signal. In addition, the output data of the second encoder illustrating a preceding section of the input signal are written in transmission direction from an encoder to a decoder after the determining data block. The output data of the second encoder relating to the current section of the input signal, i.e. which actually belong to the determining data block, may then be written when the output data of the second encoder for the preceding section are completely written. In addition, buffer information is written into the scalable data stream, wherein the buffer information indicates, how far the output data of the second encoder for the preceding section extend beyond the determining data block for the current section. The output data of the first encoder may either be written equidistantly or not at all into the scalable data stream, wherein it is, however, desired due to delay reasons to facilitate a low-delay decoding of the first scaling layer alone, i.e. only of the output data blocks of the first encoder, to write these data blocks in an equidistant and delay-optimized way.

Usually, a bit savings bank is defined among others by the maximum size of the bit savings bank, wherein this value is designated by "max bufferfullness" in FIG. 3. This value is fixed and known to the encoder. In addition, the current value of the occupancy of the bit savings bank is transmitted in the data stream, designated by "bufferfullness". The difference between the variable max bufferfullness and bufferfullness then provides the buffer information when the present invention is used for an MPEG-4 encoder, wherein it is to be considered in this case, as it is discussed below, that it may be possible that celp blocks or data of other scaling layers may not be considered, which are interspersed in the AAC blocks, in order to find the exact value of the beginning of the output data of the second data block after the LATM determining data block.

Independent of the functionality of the bit savings bank the inventive format further facilitates, however, to transmit output data blocks of a varying length of the second encoder in an equidistant grid of determining data blocks. It may therefore be sensible to choose the grid for the determining data blocks and the grid for the output data blocks of the first encoder equidistantly and in particular to select the same so that a determining data block is always followed by an output data block of the first encoder. The output data block of the second encoder is then written into the remaining gaps, wherein it is signalized by the buffer information how many data of the second encoder behind a determining data block belong to a time section which the determining data block refers to or which still count among the preceding time section of the input signal, so that the decoder may definitely and undoubtedly provide an association between output data blocks of the first encoder and an output data block of the second encoder for a time section of the input signal.

It is a further advantage of the present invention that the signalizing of the output data block after the determining data block may easily be combined with a signalizing of output data blocks of the first encoder before the determining data block for the current time section in order to facilitate a low-delay decoding only of the first scaling layer.

The inventive scalable data stream is in particular useful for real-time applications, may, however, also be used for non-real-time applications.

BRIEF DESCRIPTION OF THE DRAWINGS

In the following, preferred embodiments of the present invention are explained in more detail referring to the accompanying drawings, in which.

DETAILED DESCRIPTION OF PREFERRED EMBODIMENTS

Figure 2A:
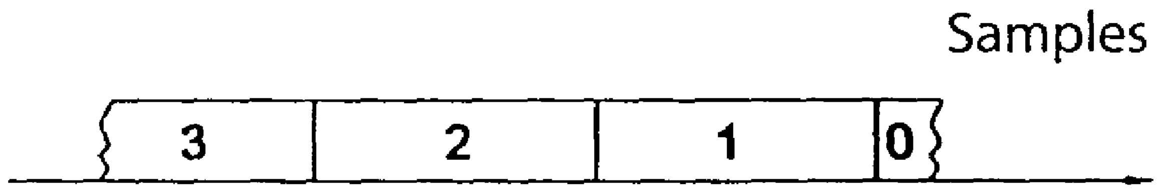
FIG. 2*a* shows a schematical illustration of an input signal which is divided into successive time sections.
Figure 2B:
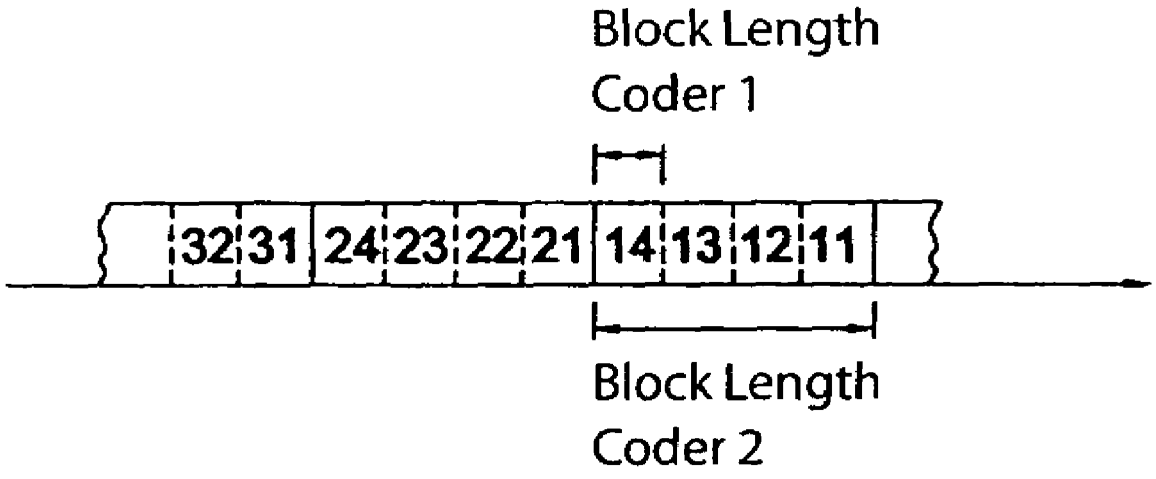
FIG. 2*b* shows a schematical illustration of an input signal which is divided into successive time sections, wherein the relation of the block length of the first encoder to the block length of the second encoder is illustrated.
Figure 2C:
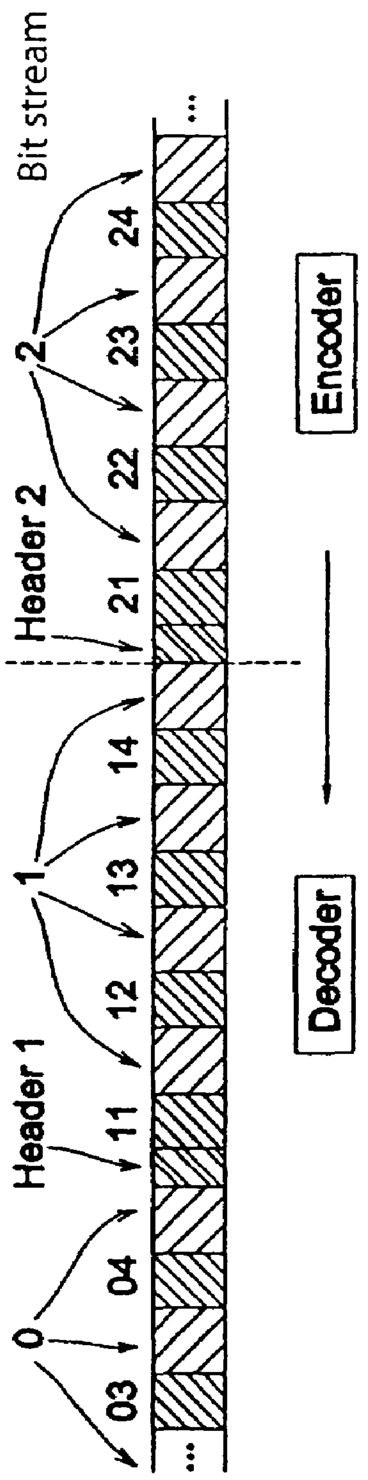
Fig. 2c (Prior Art)
FIG. 2*c* shows a schematical illustration of a scalable data stream having a high delay in the decoding of the first scaling layer.
Figure 2D:
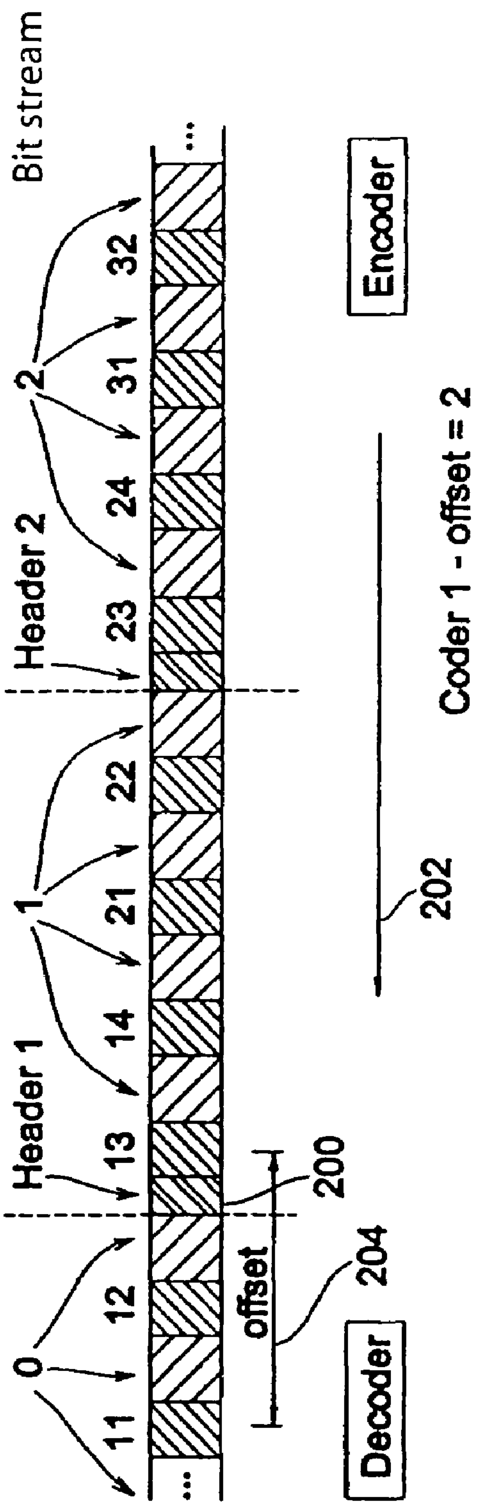
FIG. 2*d* shows a schematical illustration of a scalable data stream having a low delay in the decoding of the first scaling layer.

In the following, reference is made to FIG. 2*d* compared to FIG. 2*c* to explain a bit stream having a low delay for the first scaling layer. Like in FIG. 2*c*, the scalable data stream contains successive determining data blocks which are referred to as header 1 and header 2. In MPEG 4 the determining data blocks are LATM headers. In the transmission direction from an encoder to a decoder, as it is illustrated with an arrow 202 in FIG. 2*d*, behind the LATM header 200 the parts of the output data block of the AAC encoder hatched from top-left to bottom-right are arranged, which are entered in remaining gaps between output data blocks of the first encoder.

Further, in contrast to FIG. 2*c*, in the frame started by the LATM header 200 not only output data blocks of the first encoder are to be found, which belong into this frame, like e.g. the output data blocks 13 and 14, but also the output data blocks 21 and 22 of the subsequent section of input data. In other words, in the example illustrated in FIG. 2*d*, the two output data blocks of the first encoder, designated with 11 and 12, are present in transmission direction (arrow 202) before the LATM header 200 in the bit stream. In the example illustrated in FIG. 2*d*, the offset information 204 indicates an offset of the output data blocks of the first encoder by two output data blocks. When FIG. 2*d* is compared to FIG. 2*c* it is to be noted that the decoder may decode the lowest scaling layer already earlier than in the case of FIG. 2*c*, by a time corresponding to this offset, when the decoder is only interested in the first scaling layer. The offset information which may e.g. be signalized in the form of a "core frame offset" serve to determine the position of the first output data block 11 in the bit stream.

For the case of core frame offset =zero, the bit stream designated in FIG. 2*c* results. If, however, core frame offset >zero, then the corresponding output data block of the first encoder 11 is transmitted earlier by the number core frame offset of output data blocks of the first encoder. In other words, the delay between the first output data block of the first encoder after the LATM header and the first AAC frame results from core coder delay (FIG. 1) +core frame offset x core block length (block length of the encoder 1 in FIG. 2*b*). As it is obvious from the comparison of FIGS. 2*c* and 2*d*, for core frame offset=zero (FIG. 2*c*) after the LATM header 200 the output data blocks 11 and 12 of the first encoder are transmitted. By the transmission of core frame offset=2, the output data blocks 13 and 14 may follow after the LATM header 200, whereby the delay with a pure celp decoding, i.e. a decoding of the first scaling layer, is reduced by two celp block lengths. Optimum in the example would be an offset of three blocks. An offset of one or two blocks brings, however, also a delay advantage.

Through this bit stream set-up it is possible for the celp to transmit the generated celp block directly after encoding. In this case, no additional delay is added to the celp encoder by the bit stream multiplexer (20). Thus, for this case no additional delay is added to the celp delay by the scalable combination, so that the delay will be minimal.

It is indicated, that the case illustrated in FIG. 2*d* is only exemplary. Thus, different ratios of the block length of the first encoder to the block length of the second encoder are possible, which may e.g. vary from 1:2 to 1:12 or which may also take on other ratios, wherein ratios larger or smaller than one may occur.

In the extreme case this means (1:12 for MPEG 4 CE-LP/AAC), that for the same time section of the input signal for which the AAC encoder generates an output data block, the celp encoder generates twelve output data blocks. The delay advantage by the data stream illustrated in FIG. 2*d* versus the data stream illustrated in FIG. 2*c* may in this case reach magnitudes of a quarter to half a second. This advantage will increase the higher the ratio between the block length of the second encoder and the block length of the first encoder, wherein in the case of the AAC encoder being the second encoder a block length as high as possible is aimed at due to the then favorable ratio between useable information and side information, when the signal to be encoded facilitates the same.

Figure 2E:
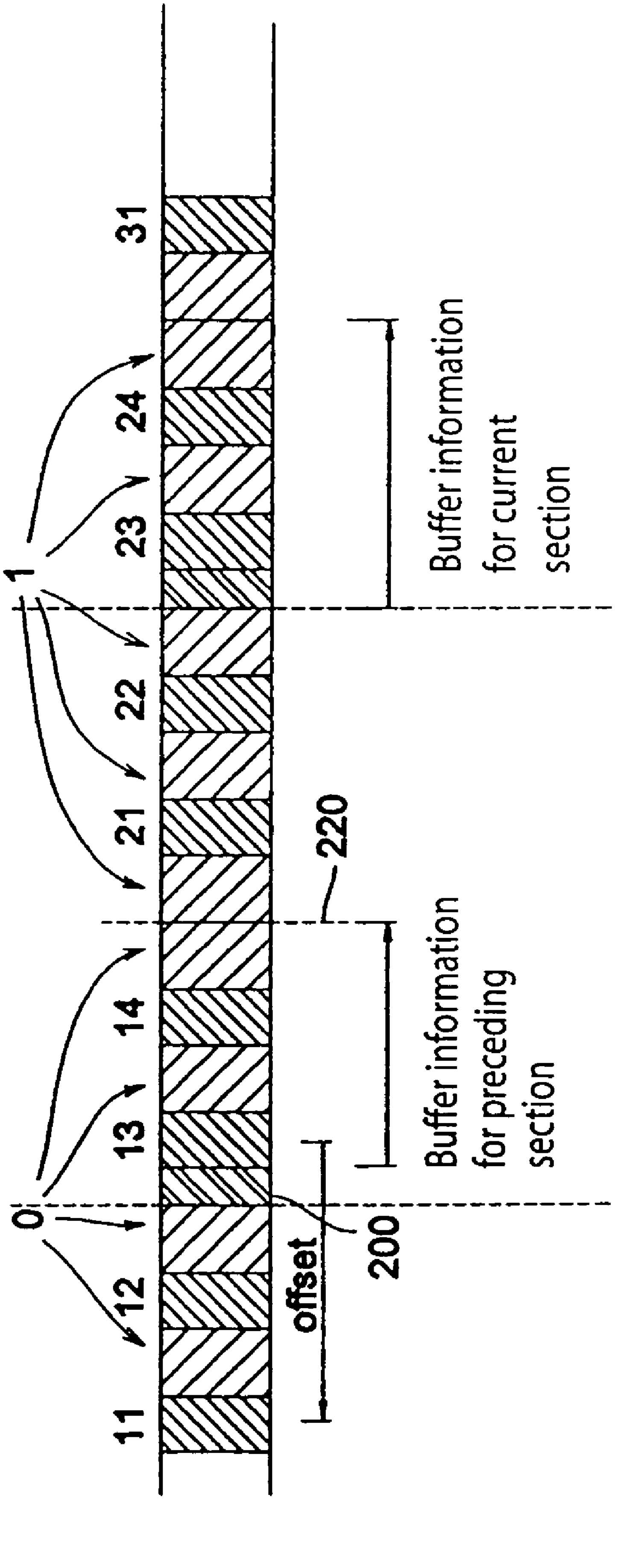
FIG. 2*e* shows a bit stream format according to the present invention, in which after the determining data block for a current section only output data of the second encoder from a preceding time section is arranged.

In the following, reference is made to FIG. 2*e*. In contrast to FIG. 2*d* in which already the offset function, i.e. the shift of output data blocks of the first encoder with regard to a determining data block, is illustrated, in FIG. 2*e* the inventive shift of the output data blocks of the second encoder with regard to the grid given by the determining data blocks is illustrated. The arrangement of the output data blocks of the first encoder designated by 11, 12, 13, 14, 21, 22, 23, 24, 31 in FIG. 2*e* is unchanged with regard to FIG. 2*d*. While no bit savings bank function is possible in FIG. 2*d*, or when the determining data blocks are to be present in a firm grid, respectively, no output data blocks of a variable length may be used for the second encoder, this is now possible in FIG. 2*e* according to the present invention.

To this end, data from the output data block of the second encoder of the preceding section designated by "0" in the FIGS. 2*a* to 2*e* is written in transmission direction-from an encoder to a decoder after the LATM header 200, until the scalable encoder has written any data of the preceding section into the bit stream. Only then it is started at a transmission limit 220 to write the output data of the second encoder for the current section of the input signal into the bit stream. Thus, the transmission limit 220 may coincide with a limit of the celp data block or not. Depending on this signalizing, either the distance from the end of the determining data block to the transmission limit 220 or again the distance from the beginning of the determining data block to the transmission limit 220 or again the distance from the rear limit of the celp block 13 to the transmission limit 220 with or without the length of the celp blocks 13, 14 and/or the length of the determining data block may be signalized as buffer information. The latter variant will be illustrated in more detail referring to FIG. 3.

Figure 3:
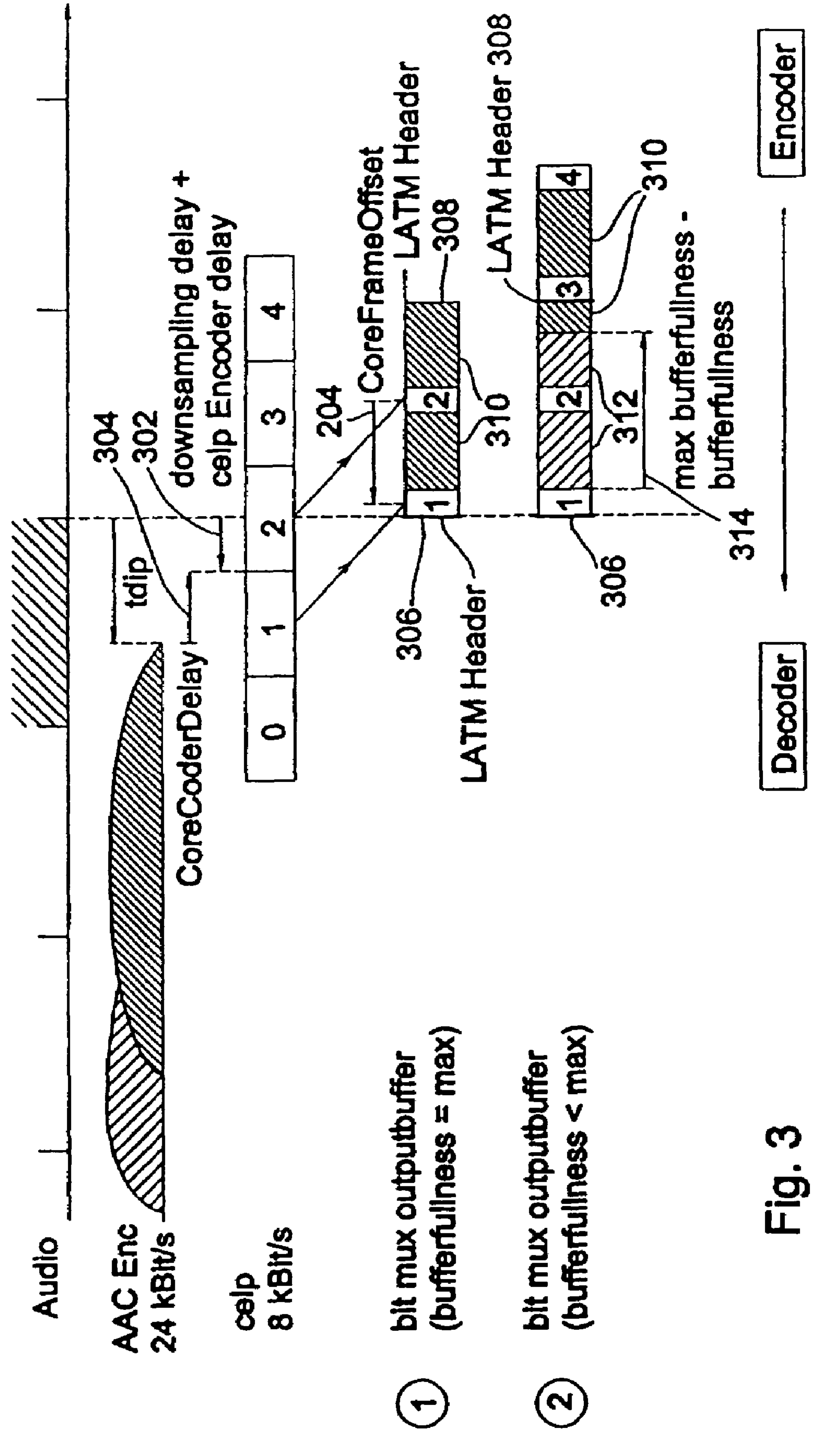
FIG. 3 shows a detailed illustration of the inventive scalable data stream at the example of a celp encoder as the first encoder and an AAC encoder as the second encoder having a bit savings bank function.
Figure 4:
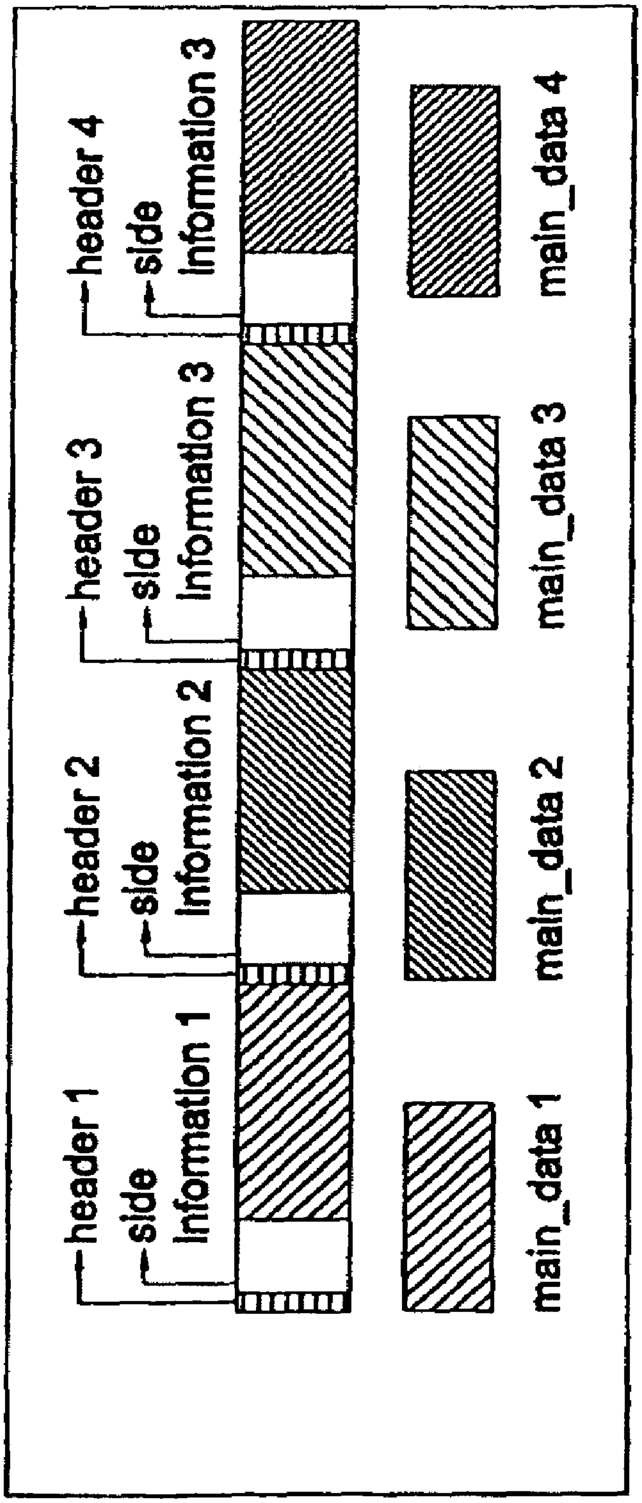
FIG. 4 shows an example for a bit stream format having a fixed frame length.
Figure 5:
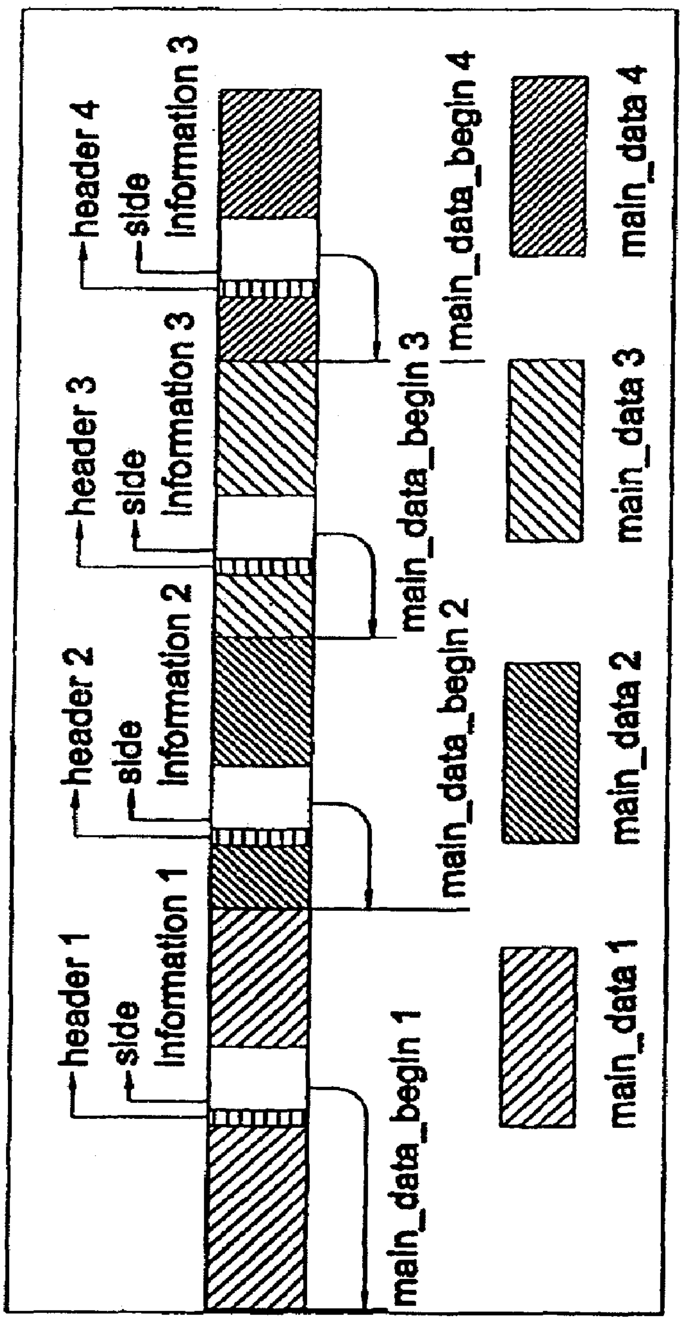
FIG. 5 shows an example for a bit stream format having a fixed frame length and a backpointer.
Figure 6:
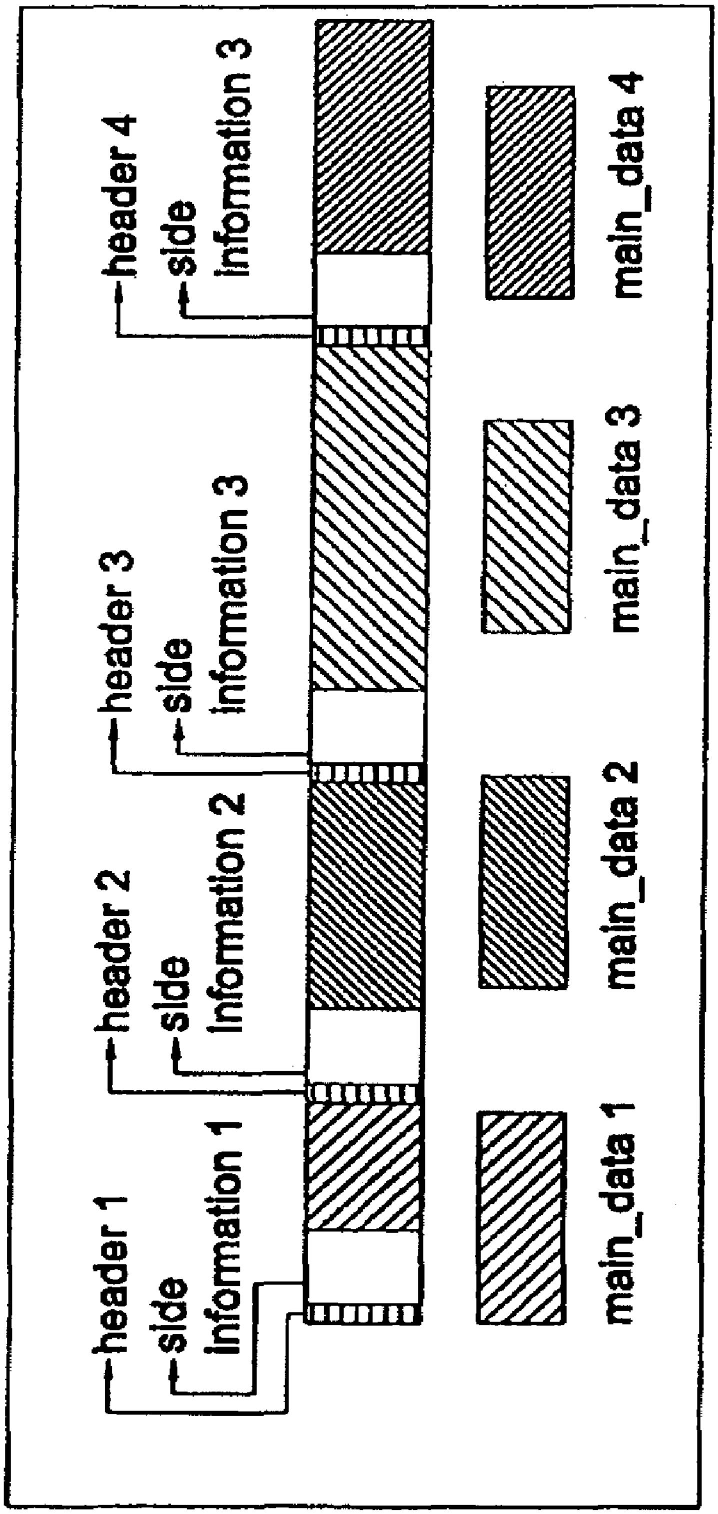
FIG. 6 shows an example of a bit stream format having a variable frame length.

According to the invention, in the case of the application for a scalable integer it is preferred to provide no inherent side information for signalizing the buffer information but to use the value bufferfullness already transmitted in the bit stream to this end, wherein the length of the pointer designated by "buffer information" in FIG. 2*e*, which is designated with the reference numeral 314 in FIG. 3, is exactly equal to the difference between max bufferfullness and bufferfullness when the length of the determining data block and the length of possibly present celp blocks and possibly present further scaling layers is not considered, as it is illustrated by the arrow drawn in dashed lines referring to FIG. 3.

In the following, reference is made to FIG. 3, which is similar to FIG. 2, however illustrates the special implementation at the example of MPEG 4. In the first line again a current time section is illustrated in a hatched way. In the second line the windowing used with the AAC encoder is illustrated schematically. As it is known, an overlap-and-add of 50% is used, so that a window usually comprises double the length of time samples than the current time section, which is illustrated in a hatched way in the top line of FIG. 3. In FIG. 3, further the delay tdip is drawn in, which corresponds to block 26 of FIG. 1 and which has a size of ⅝ of the block length in the selected example. Typically, a block length of the current time section of 960 samples is used, so that the delay tdip of ⅝ of the block length amounts to 600 samples. As an example, the AAC encoder provides a bit stream of 24 kBit/s, while the celp encoder schematically illustrated below the same provides a bit stream with a rate of 8 kBit/s. This results in an overall bit rate of 32 kBit/s.

As it may be seen from FIG. 3, the output data blocks zero and one of the celp encoder correspond to the current time section of the first encoder. The output data block having the number 2 of the celp encoder already corresponds to the next time section. The same holds true for the celp block having the number 3. In FIG. 3, further the delay of the downsampling stage 28 and the celp encoder 12 is drawn in by an arrow which is illustrated with the reference numeral 302. From this, as the delay which has to be set by stage 34 so that at the subtracting position 40 of FIG. 1 the same conditions are present, the delay results which is designated by core coder delay and illustrated using an arrow 304 in FIG. 3. This delay may alternatively also be generated by block 26. It for example holds true:

core coder delay==*t*dip−celp encoder delay−downsampling delay==600−120−117=363 samples.

For the case without a bit savings bank function or for the case, respectively, that the bit savings bank (bit mux output buffer) is full, which is indicated by the variable bufferfullness=max, the case indicated in FIG. 2*d* results. In contrast to FIG. 2*d* in which four output data blocks of the first encoder are generated corresponding to one output data block of the second encoder, in FIG. 3 for one output data block of the second encoder which is drawn in black in the two last lines of FIG. 3 two output data blocks of the celp encoder are generated which are designated by "0" and "1". According to the invention, now, however, after a first LATM header 306 not the output data block of the celp encoder with the number "0" is written anymore, but the output data block of the celp encoder having the number "one", as the output data block having the number "zero" has already been transmitted to the decoder. In the equidistant grid distance provided for the celp data blocks, after the celp block 1 the celp block 2 follows for the next time section, wherein then for completing a frame the rest of the data of the output data block of the AAC encoder is written into the data stream until a next LATM header 308 follows for the next time section.

The present invention may simply be combined with the bit savings bank function, as it is illustrated in the last line of FIG. 3. For the case, that the variable "bufferfullness" which indicates the filling of the bit savings bank, is smaller than the maximum value, this means, that the AAC frame for the directly preceding time section needed more bits than actually admissible. This means, that after the LATM header 306 the celp frames are written as before, that, however, firstly the output data block or the output data blocks of the AAC encoder from preceding time sections must be written into the bit stream, before the writing of the output data block of the AAC encoder for the current time section may be started. From the comparison of the two last lines of FIG. 3, which are designated by "1" and "2", it may be seen, that the bit savings bank function also directly leads to a delay within the encoder for the AAC frame. Thus, the data for the AAC frame of the current time section, which are designated by 310 in FIG. 3, are, however, present at the same time as in case "1", may, however, only be written into the bit stream after the AAC data 312 for the directly preceding time section have been written into the bit stream. Depending on the bit savings bank level of the AAC encoder therefore the initial position of the AAC frame is shifted.

The bit savings bank level is transmitted by the variable "bufferfullness" according to MPEG 4 in the element StreamMuxConfig. The variable bufferfullness is calculated from the variable bit reservoir divided by the 32-fold of the currently present channel number of the audio channels.

Figure 1:
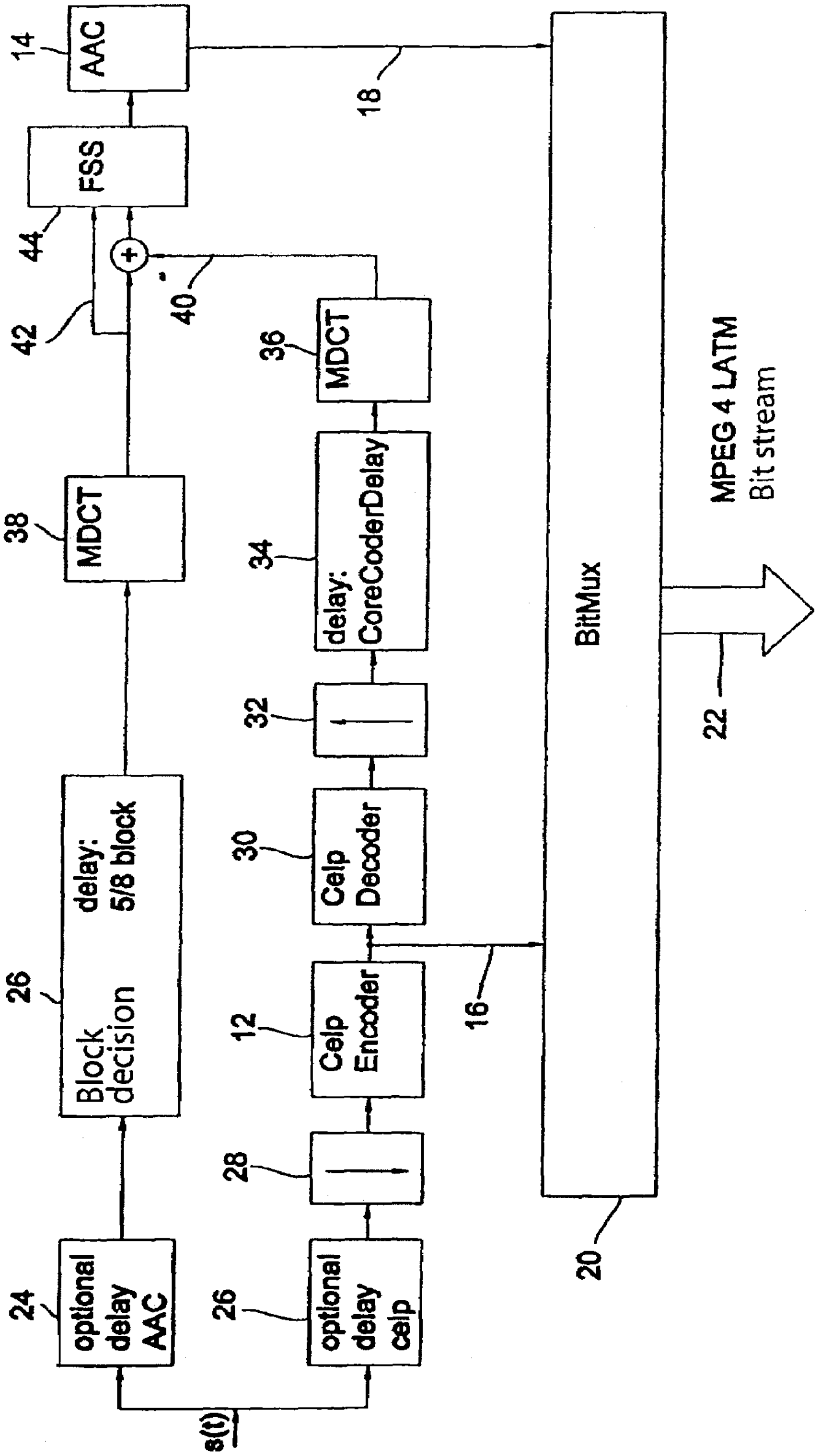
FIG. 1 shows a scalable encoder according to MPEG 4.

It is to be noted that the pointer designated with the reference numeral 314 in FIG. 3 and whose length=max bufferfullness-bufferfullness, is a forward pointer which as it were points into the future, while the pointer drawn in FIG. 1 is a backward-pointer which as it were points into the past. The reason for this is that according to the present embodiment the LATM header is always written into the bit stream after the current time section has been processed by the AAC encoder, although AAC data from preceding time sections are possibly still to be written into the bit stream.

It is further to be noted that the pointer 314 is deliberately drawn in an interrupted way below the celp block 2, as it does not consider the length of the celp block 2 or the length of the celp block 1, as this data has of course nothing to do with the bit savings bank of the AAC encoder. Further, no header data and bits of possibly present further layers are considered.

In the decoder, first of all an extraction of the celp frames from the bit stream is performed which is easily possible as the same are for example arranged equidistantly and have a fixed length.

In the LATM header, length and distance of all celp blocks may be signalized, so that in every case a direct decoding is possible.

Thereby, the parts of the output data of the AAC encoder of the directly preceding time section which were as it were separated by the celp block 2 may be joined again, and the LATM header 306 as it were moved to the beginning of the pointer 314, so that the decoder knowing the length of the pointer 314 knows, when the data of the directly preceding time section is over, to be able to decode the directly preceding time section together with the celp blocks present for the same with full audio quality when this data is completely read in.

In contrast to the case illustrated in FIG. 2*c*, in which an LATM header is followed both by the output data blocks of the first encoder and also by the output data block of the second encoder, now on the one hand by the variable core frame offset a shift of output data blocks of the first encoder to the front within the bit stream may be performed, while by the arrow 314 (max bufferfullness-bufferfullness) a shift of the output data block of the second encoder to the rear within the scalable data stream may be achieved, so that the bit savings bank function may also be implemented in the scalable data stream in a simple and secure way, while the basic grid of the bit stream is maintained by the successive LATM determining data blocks which are always written when the AAC encoder has encoded a time section, and which therefore may serve as a reference point also when a large part of the data in a frame designated by an LATM header on the one hand originate from the next time section (regarding the celp frame) or from the directly preceding time sections (regarding the AAC frame) as it is illustrated in the last line in FIG. 3, wherein the respective shifts are provided to a decoder by the two variables to be additionally transmitted within the bit stream.

What is claimed is:

1. Method for generating a scalable data stream from one or several blocks of output data of a first encoder and from one or several blocks of output data of a second encoder, wherein the one or the several blocks of output data of the first encoder together represent a number of samples of the input signal for the first encoder forming the current section of the input signal for the first encoder, and wherein the one block or the several blocks of output data of the second encoder together represent a number of samples of the input signal for the second encoder, wherein the number of samples for the second encoder represent a current section of the input signal for the second encoder, wherein the number of samples for the first encoder and the number of samples for the second encoder are equal and wherein the current sections for the first and the second encoders are identical or shifted to each other by a period of time, comprising:

writing a header for the current section of the input signal for the first encoder or the second encoder;

writing output data of the second encoder for a preceding section of the input signal for the second encoder, in transmission direction from an encoder to a decoder after the header for the current section;

writing output data of the second encoder for the current section of the input signal for the second encoder, when the output data of the second encoder for the preceding section of the input signal are written;

writing buffer information into the scalable data stream, wherein the buffer information indicates how far the output data of the second encoder for the preceding section extend beyond the header for the current section; and writing the one or the several blocks of output data of the first encoder into the scalable data stream.

2. Method according to claim 1, wherein the lengths of the blocks of output data of the second encoder are different for sections of the input signal of the same length, wherein the lengths of the blocks of output data depend on signal characteristics of the input signal;

wherein the one or the several blocks of output data of the first encoder are of equal length for sections of the input signal of equal length; and wherein the transmission rate of the bit stream is constant.

3. Method according to claim 1, wherein the second encoder comprises a bit reservoir function, wherein the maximum size of the bit reservoir is given by maximum buffer size information, and wherein the current level of the bit reservoir is given by current buffer information, wherein the buffer information is current buffer information, and wherein the size, how far the output data of the second encoder for the preceding time section extends beyond the header, may be derived from the difference between the maximum buffer size information and the current buffer information.

4. Method according to claim 1, wherein the writing of output data of the first encoder is performed so that a block of output data of the first encoder is arranged directly after a header, and wherein the length of this header and the length of the present output data blocks of the first encoder and possibly present data of further scaling layers are ignored when determining how far the amount of output data of the second encoder for the preceding section extend beyond the header for the current section, using the current buffer information and the maximum buffer size information.

5. Method according to claim 1,

Wherein the step of writing the one or the several blocks of output data of the first encoder writes the blocks of output data of the first encoder equidistantly into the scalable data stream.

6. Method according to claim 1, wherein the first encoder is a celp encoder, wherein the second encoder is an AAC encoder, and wherein the header is an LATM header according to MPEG 4.

7. Method according to claim 1, wherein the at least one block of output data of the second encoder and the at least one block of output data of the first encoder is payload data in a superframe which comprises exactly one header apart from the payload data.

8. Method according to claim 1, wherein in the step of writing the blocks of output data of the first encoder at least one block of output data of the first encoder for the current section of the input signal is written for the first encoder in transmission direction before the header for the current time section.

9. Device for generating a scalable data stream from one or several blocks of output data of a first encoder and from one or several blocks of output data of a second encoder, wherein the one or the several blocks of output data of the first encoder together represent a number of samples of the input signal for the first encoder, forming a current section of the input signal for the first encoder, and wherein the one block or the several blocks of output data of the second encoder together represent a number of samples of the input signal for the second encoder, wherein the number of samples for the second encoder form a current section of the input signal for the second encoder, wherein the number of samples for the first encoder and the number of samples for the second encoder are equal and wherein the current sections for the first and the second encoders are identical or shifted from each other by a period of time, comprising:

means for writing a header for the current section of the input signal for the first or the second encoder;

means for writing output data of the second encoder for a preceding section of the input signal for the second encoder, in transmission direction from an encoder to an decoder after the header for the current section;

means for writing output data of the second encoder for the current section of the input signal for the second encoder when the output data of the second encoder for the preceding section of the input signal are written;

means for writing buffer information into the scalable data stream, wherein the buffer information indicates how far the output data of the second encoder for the preceding section extend beyond the header for the current section; and means for writing the one or the several blocks of output data of the first encoder into the scalable data stream.

10. Method for decoding a scalable data stream from one or several blocks of output data of a first encoder and from or several blocks of output data of a second encoder, wherein the one or the several blocks o-f output data of the first encoder together represent a number of samples of the input signal for the first encoder, forming a current section of the input signal for the first encoder, and wherein the one block or the several blocks of output data of the second encoder together represent a number of samples of the input signal for the second encoder, wherein the number of samples for the second encoder form a current section of the input signal for the second encoder, wherein the number of samples for the first encoder and the number of samples for the second encoder are equal, and wherein the current sections for the first and the second encoder are identical or shifted to each other by a period of time, wherein the scalable data stream comprises a header for the current section for the first or the second encoder, output data of the second encoder for a preceding section of the input signal in transmission direction after the header for the current section, and buffer information, indicating how far the output data of the second encoder for the preceding section extend beyond the header for the current section, comprising:

reading the header for the current section of the input signal for the first or the second encoder;

reading the output data of the first encoder for the current section of the first encoder;

reading the buffer information indicating how far the output data of the second encoder for the preceding section extend beyond the header for the current section;

reading the output data of the second encoder for the current section starting from a position in the scalable data stream indicated by the buffer information; and decoding the output data of the second encoder and the output data of the first encoder to obtain a decoded signal.

11. Device for decoding a scalable data stream from one or several blocks of output data of a first encoder and from or several blocks of output data of a second encoder, wherein the one or the several blocks of output data of the first encoder together represent a number of samples of the input signal for the first encoder, forming a current section of the input signal for the first encoder, and wherein the one block or the several blocks of output data of the second encoder together represent a number of samples of the input signal for the second encoder, wherein the number of samples for the second encoder form a current section of the input signal for the second encoder, wherein the number of samples for the first encoder and the number of samples for the second encoder are equal, and wherein the current sections for the first and the second encoder are identical or shifted to each other by a period of time, wherein the scalable data stream comprises a header for the current section for the first or the second encoder, output data of the second encoder for a preceding section of the input signal in transmission direction after the header for the current section, and buffer information indicating how far the output data of the second encoder for the preceding section extend beyond the header for the current section, comprising:

a bit stream demultiplexer, configured to perform the following steps:

reading the header for the current section of the input signal for the first or the second encoder;

reading the output data of the first encoder for the current section of the first encoder;

reading the buffer information indicating how far the output data of the second encoder for the preceding section extend beyond the header for the current section;

reading the output data of the second encoder for the current section starting from a position in the scalable data stream indicated by the buffer information; and a decoder for decoding the output data of the second encoder and the output data of the first encoder to obtain a decoded signal.

* * * * *